Nov. 10, 1931.        G. C. CARHART            1,831,480
            TRANSMISSION MECHANISM FOR MOTOR VEHICLES
                    Filed June 2, 1927      3 Sheets-Sheet 1

INVENTOR.
George C. Carhart
BY
Parsons & Bodell
ATTORNEYS.

Nov. 10, 1931.    G. C. CARHART    1,831,480
TRANSMISSION MECHANISM FOR MOTOR VEHICLES
Filed June 2, 1927    3 Sheets-Sheet 3

INVENTOR.
George C. Carhart
BY
Parsons & Bodell
ATTORNEYS.

Patented Nov. 10, 1931

1,831,480

UNITED STATES PATENT OFFICE

GEORGE C. CARHART, OF SYRACUSE, NEW YORK, ASSIGNOR TO BROWN-LIPE GEAR COMPANY, OF SYRACUSE, NEW YORK, A CORPORATION OF NEW YORK

TRANSMISSION MECHANISM FOR MOTOR VEHICLES

Application filed June 2, 1927. Serial No. 196,115.

This invention relates to transmission mechanism for motor vehicles and has for its object, an arrangement of a clutch for disconnecting the transmission gearing from the propeller shaft, which clutch embodies lighter sections rotatable with the transmission shaft of the gearing so that when the clutch is disconnected, the gearing will be subjected to a minimum fly wheel effect and also, a simple and compact brake arrangement embodied in the clutch and operable to brake or retard the rotation of the trasmission gearing when the clutch is disengaged.

The invention consists in the novel features and in the combinations and constructions hereinafter set forth and claimed.

In describing this invention, reference is had to the accompanying drawings in which like characters designate corresponding parts in all the views.

Figure 1:
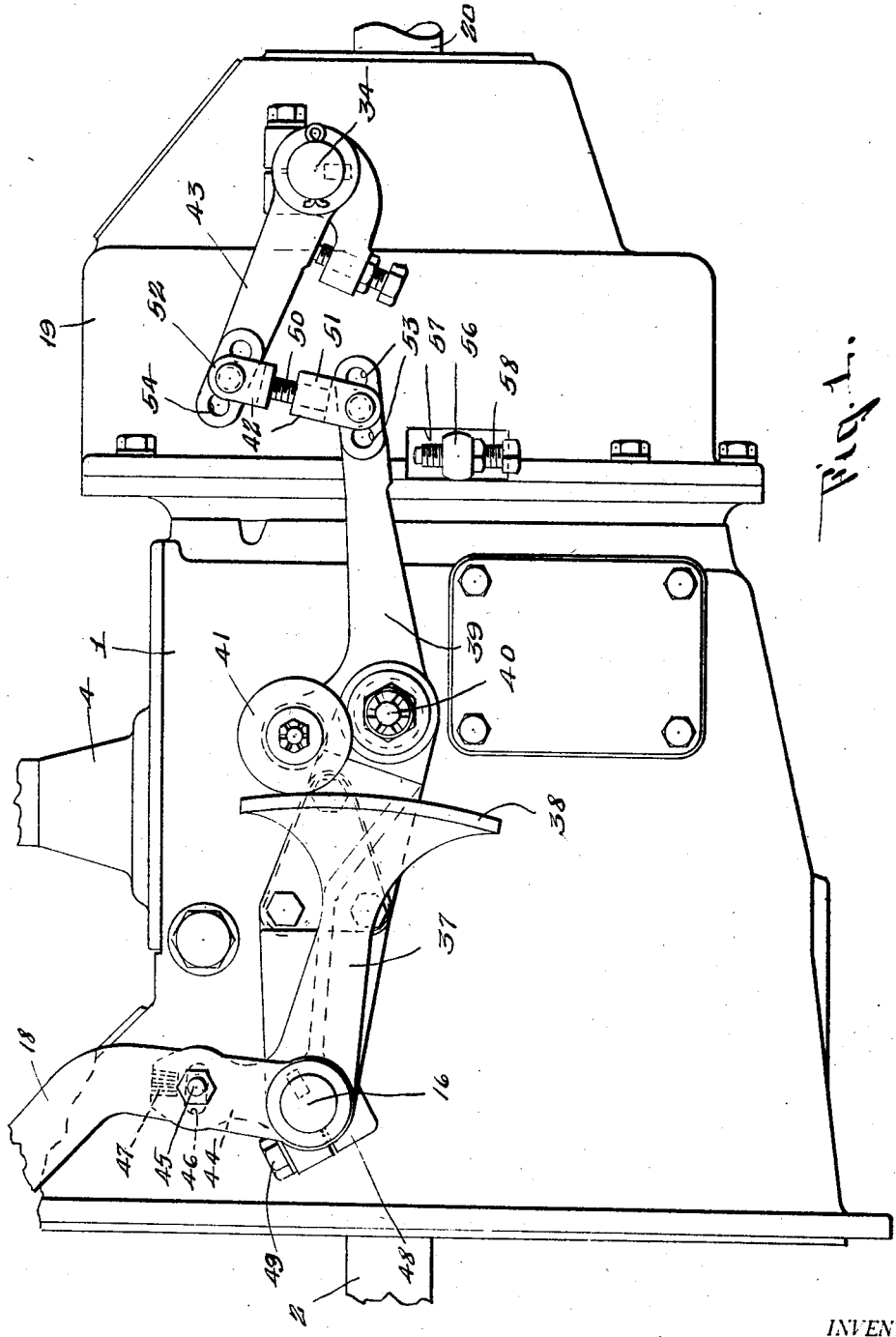
Figure 1 is a side elevation of a transmission mechanism embodying my invention.
Figure 2:
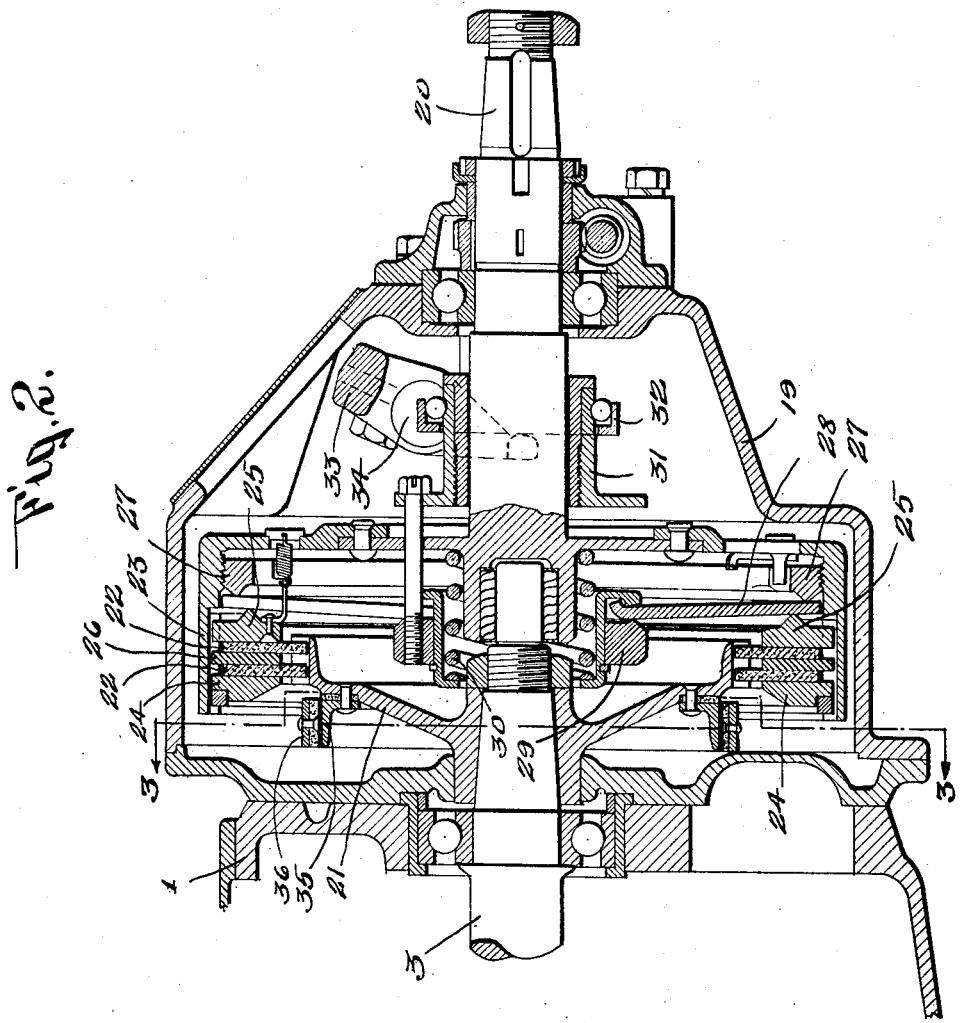
Figure 2 is an enlarged sectional view of the rear clutch.
Figure 3:
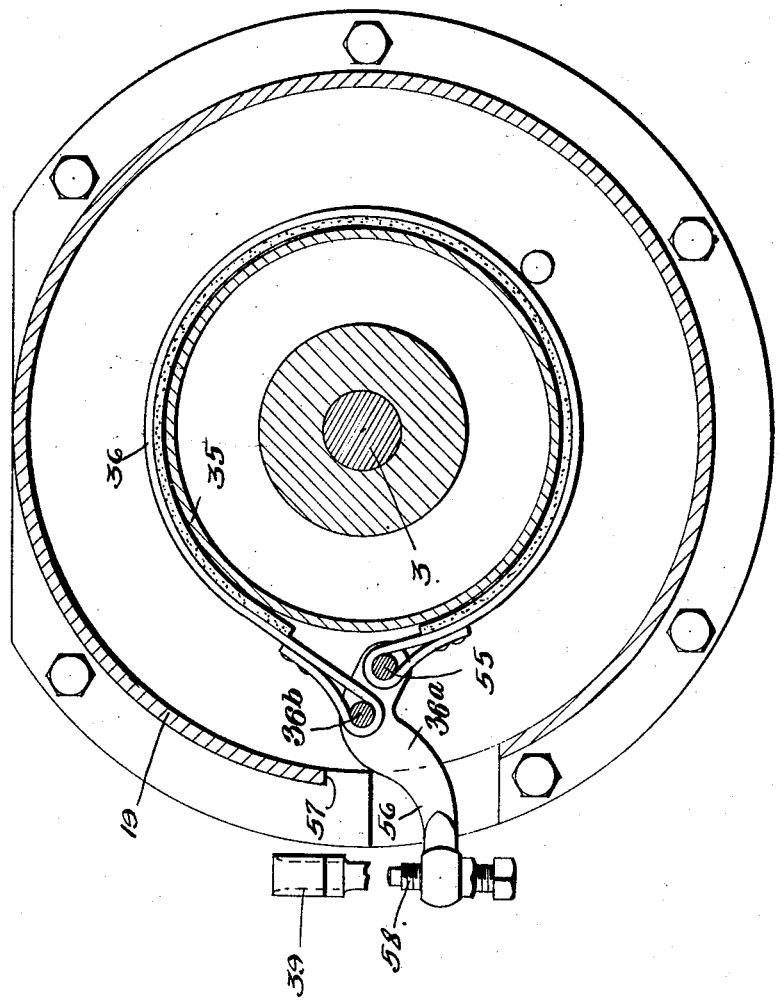
Figure 3 is a detail view of the rear clutch section on the transmission shaft taken on line 3—3, Figure 2, and showing the brake drum and band.

1 designates the casing of a conventional transmission gearing which includes the usual driving shaft 2, transmission shaft 3 in line therewith and a change speed gearing including shiftable elements between said shafts, the shifting being effected by means of a selecting and shifting lever located in the usual housing 4.

The front clutch is of the conventional type, and preferably of the single plate type having the part which is rotatable with the shaft 2 of light weight. The rear clutch is mounted in a housing 19 suitably secured to the rear end of the gear casing 1 in which casing is also journalled a propeller shaft driver 20 mounted in line with the transmission shaft 3. The rear clutch which connects the shafts 3 and 20 is a double single plate clutch or a clutch requiring a light clutch spring and which is operable to be declutched against the action of the spring through motion multiplying levers. In the rear clutch the lighter single plate section is carried by the transmission shaft 3 in order that when the clutch is disengaged there will be a minimum fly wheel effect on the shaft 3.

21 designates the section mounted on the rear end of the transmission shaft 3 within the casing 19, this section being a drum in the form of a gear wheel and fiber toothed friction disks 22 are interlocked with the drum 21. The section mounted on the propeller shaft driver 20 includes an outer drum 23 surrounding the drum 21, an abutment plate 24, a pressure ring 25 for pressing against the disks 22 and an intermediate steel disk 26 interleaved with the disks 22, these parts being rotatable with the outer drum 23 as well as the fulcrum ring 27, the multiplying levers 28, throw-out sleeve 29, spring 30 and throw-out sleeve 31. The throw-out sleeve is operated by means of a throw-out collar or bearing 32 with which coacts a yoke 33 mounted on the throw-out shaft 34 mounted in the housing 19. The inner clutch drum 21 which is mounted on the transmission shaft 3 is also provided with a brake drum 35 located in front of said drum 21 and with which coacts a brake band 36.

The connections between the throw-out shaft 16 for the front clutch (see Figure 1) and throw-out shaft 34 for the rear clutch comprise a lever 37 mounted on the shaft 16 to rock therewith and having a cam 38 at its rear end, an angle lever 39 mounted to rock on a stud 40 projected in from the side of the gear case 1 and having a short arm extending upwardly and provided with a follower 41 coacting with the cam and a rearwardly extending long arm connected by a link 42 to a rock arm 43 mounted on the outer end of the rear throw-out shaft 34. The lever 37 is connected to rock with the shaft 16 through the clutch pedal 18 and it is shown as provided with an upwardly extending radial arm 44 lying adjacent the clutch pedal 18 and connected to the clutch pedal by an adjustable connection including a bolt 45 extending through the clutch pedal and through a slot 46 in the arm 44.

By reason of the bolt and slot, the initial angular position of the cam lever 37 relatively to the clutch pedal and to the shaft 16 can be adjusted. The abutting faces of the clutch pedal 18 and the arm 44 are serrated as shown at 47 for the obvious purpose of preventing relative slipping of the cam lever 37 and the clutch pedal. This cam lever 37 also has a split bearing 48 on the shaft 16 which bearing is clamped in position by a screw 49. By loosening the screw 49 and the nut on the bolt 45, the cam lever 37 can be adjusted and thereafter the screw 49 and the nut on the bolt 45 tightened. The cam 38 is arc shaped or has a small rise and the arc is struck from a different center than that of the shaft 16 and is located relatively to the center of the shaft 16 so that its lower end is farther removed from the center of the shaft 16 than its upper end. The link 42 is also adjustable endwise, it including a screw 50 threading into clevices 51 and 52 pivoted to the arms 39 and 43 respectively.

For further adjustment, each of these arms is provided with a plurality of holes 53 and 54 in any of which the pivots may be located. Obviously, upon operation of the foot pedal 18, the motion thereof will be transmitted to the throw-out shaft 34 of the rear clutch.

The brake band 36 is operated by the throw-out means and in the illustrated embodiment of my invention, the brake band which is normally expanded by its own resiliency is contracted by a link 36ª pivoted at 36ᵇ and 55 to the ends of the brake band and arranged so that a movement of this link so that its inner end passes upwardly and its outer end downwardly, contracts the brake band causing the ends to overlap more or less.

The link as here shown is provided with an arm 56 which extends out through a slot 57 in the casing in the path of a portion of the throw-out means for the rear clutch. As here illustrated, it extends into the path of the lever arm 39 and is provided with an adjusting screw 58 arranged in the path of the arm 39 near the outer end thereof. Obviously, upon downward movement of the lever arm 39 when the clutch pedal 18 is depressed, said arm will first actuate the throw-out arm 43 for the rear clutch and thereafter actuate the arm 56 to engage the brake band with the brake drum.

Owing to the use of front and rear clutches having comparatively light sections rotatable with the shafts of the gearing, the gears of the gearing are not actuated by the fly wheel effect of the clutch sections when the clutches are disengaged and a comparatively light brake or a brake requiring a little effort to apply it, can be effectively used to overcome the momentum due to the gears of the gearing. In fact, this mechanism is efficient for easy gear shifting without any brake mechanism and further as a comparatively light brake can be used, a simple brake of the brake band type not dependent upon the axial shifting of any of its parts can be employed and operated through a simple mechanism not involving axial shifting. Furthermore, owing to the long easy cam at the end of a long lever arm and to the use of a single or a double plate rear clutch, the rear clutch is operable in sequence with the front clutch upon small movement of the clutch pedal and with no extra effort that is appreciable to the operator.

What I claim is:

1. The combination of the driven shaft of a transmission gearing, a propeller shaft driver mounted in line with the transmission shaft of the gearing, a friction clutch including sections mounted respectively on the transmission shaft and the propeller shaft driver, the section mounted on the transmission shaft having a brake drum associated therewith, a brake band coacting with the brake drum, throw-out means for the clutch and means to apply the brake band to the drum operable by the throw-out means, the clutch section mounted on the transmission shaft comprising annular members of light weight.

2. The combination of the driven shaft of a transmission gearing, a propeller shaft driver mounted in line with the transmission shaft of the gearing, a friction clutch including sections mounted respectively on the transmission shaft and the propeller shaft driver, the section mounted on the transmission shaft having a brake drum associated therewith, a brake band coacting with the brake drum, throw-out means for the clutch and means to apply the brake band to the drum operable by the throw-out means including an arm extending into the path of a portion of the throw-out means for the clutch and normally spaced apart from said portion, whereby the clutch operating means disengages the clutch before applying the brake band to the drum.

In testimony whereof, I have hereunto signed my name, at Syracuse, in the county of Onondaga, and State of New York, this 28th day of May, 1927.

GEORGE C. CARHART.